United States Patent Office 3,503,707
Patented Mar. 31, 1970

3,503,707
SILICA PIGMENTS AND PREPARATION THEREOF
Oliver W. Burke, Jr., 506 Intracoastal Drive,
Fort Lauderdale, Fla. 33304
No Drawing. Continuation-in-part of application Ser. No. 480,184, Aug. 16, 1965. This application May 20, 1968, Ser. No. 730,592
Int. Cl. C01b 33/00, 33/14, 33/18
U.S. Cl. 23—182          6 Claims

ABSTRACT OF THE DISCLOSURE

Silica pigments are precipitated by the acidulation of aqueous sodium silicate solution with carbon dioxide, and consist of aggregations and flocs of ultimate particles. In prior Patent No. 3,250,594 the sizes of the ultimate particles, the aggregations, and the flocs, are controlled relative to each other, by acidulating with carbon dioxide at different average rates in different ranges during critical stages of the acidulation. One embodiment herein improves that process by interrupting the acidulation with carbon dioxide and aging the aqueous alkali metal silicate at critical stages of the acidulation to permit the formation of precipitating particles while maintaining a constant alkalinity of the partially acidulated solution. In one embodiment the new process is effected in the absence of soluble salt other than that produced by the acidulation.

CROSS-REFERENCE TO RELATED APPLICATION

This application is a continuation-in-part of copending parent application Ser. No. 480,184 filed Aug. 16, 1965 (abandoned following filing hereof), and the word "copending" hereinafter has reference to copendency with said parent application.

BRIEF SUMMARY OF THE INVENTION

This invention relates to silica pigment materials and to the preparation thereof from alkali metal silicate, and aims generally to improve the same.

Particular objects of the invention, severally and interdependently, are to provide an improved process for the preparation of silica pigments; to provide a process for aiding in controlling the relative sizes and uniformity of the primary particles of colloidal silica and of the aggregates and flocs thereof which form the silica pigment particles, e.g. for the production of improved silica pigment materials; to provide a process for precipitating the silica pigment in predominant part in a very alkaline form in which the weight ratio of silica to sodium oxide of the pigment does not exceed 5.3 to 1, and to provide improved silica pigments having useful characteristics and at an economical cost.

In more detail:

One object of the present invention is to control in a novel manner the conditions under which the primary colloidal sized silica particles aggregate to form the predominant part of the precipitate.

Another object is to effect the aggregation of the primary colloidal sized silica pigment particles to form the predominant part of the precipitate while maintaining constant the weight ratio of $SiO_2$ to $M_2O$—wherein M is alakil metal—in the aqueous alkali metal silicate, so that the predominant part of the precipitate is formed at substantially a constant weight ratio of these components.

Another object is to effect the aggregation of the primary colloidal sized silica pigment particles to form the predominant part of the silica pigment precipitate in a more alkaline state than is obtained by the known processes.

Another object is to effect the aggregation of the primary colloidal sized silica pigment particles to form the predominant part of the silica precipitate in a more alkaline and constant state than is obtained with the known processes.

Yet another object of the present invention is to effect the precipitation of all the silica pigment with a higher ratio of $M_2O$ to $SiO_2$ than has been obtained by the known processes and with the predominant part thereof precipitated at a constant ratio of $M_2O/SiO_2$ higher than is obtained in the known process.

Still another object is to effect a more uniform control of the relative sizes of the primary colloidal silica pigment particles and the network aggregates and flocs thereof.

Other objects and advantages of the invention will be apparent from a consideration of the herein set forth general and specific descriptions of illustrative embodiments thereof.

The invention resides in the new and useful features and combinations characterizing the processes and products herein exemplified, and is more particularly defined in the appended claims.

GENERAL DESCRIPTION

The present invention is concerned with the production of silica pigment by the acidulation of aqueous alkali metal silicate e.g. sodium silicate, especially with carbon dioxide as acidulating agent.

The course of the acidulation of sodium silicate solution to precipitate silica therefrom according to known processes such as those set forth in my copending joint applications Ser. No. 442,144 (now Patent No. 3,250,594) and Ser. No. 422,454 (now Patent No. 3,325,249), can be classified in several distinct stages. Prior to acidulation, of course, is the preparatory stage in which the sodium silicate is diluted with water and in which the factor $x$ designating the weight ratio of $SiO_2$ to $Na_2O$ in the sodium silicate formula $Na_2O/(SiO_2)_x$ remains unchanged. As a practical matter, in commercial sodium silicate used for the production of precipitated silica, the value of $x$ lies below 3.8, usually in the range of about 3.0 to 3.4, e.g. 3.22 in the 41° Bé. sodium silicate of commerce.

The first period or stage in such known processes of acidulation one can call the pre-precipitation stage, during which the silica of solution is polymerizing to form colloidal particles, i.e., the primary silica particles also sometimes called the ultimate silica particles. In this stage, no appreciable number of colloidal silica particles have aggregated to form precipitating particles. The end of this stage may be considered to extend to a point at which the $x$ value lies in the range of 4.2 to 5.3 (depending on the conditions present), or may be taken at the point where a Tyndall effect appears, which usually occurs between $x$ values of 4.2 and 5.3, but can occur at as high an $x$ value as 7.0 or more under certain combinations of conditions.

The tyndall effect concerned of course is that defined in J. Thewlis's Encyclopaedic Dictionary of Physics, Pergamon Press, 1962, as follows:

"Tyndall effect.—The scattering of light by very small particles, the scattered light being predominantly blue."

This authority further states that:

"This phenomenon and its dependence on the size of the scattering particles was first investigated by Tyndall. The scattered intensity is proportional to the square of the volume of the particle and proportional to $(1/\lambda)^4$. Thus the scattering for light at the blue end of the spectrum is about ten times as great as for light at the red end."

Following the appearance of the Tyndall effect in the known processes, continuation of the acidulation causes progressive precipitation of the silica pigment. When the Tyndall effect occurs between $x$ values of 4.2 and 5.3, usually nearly 10% of the silica is precipitated by acidulation to an $x$ value of about 6.4 (or higher, depending on conditions present), and the precipitation of the silica pigment is substantially complete when 70% of the stoichiometric quantity of acidulating agent has been added, at which point $x$ has a value of about 10 or more (which value may also vary with the conditions present, e.g. may be lowered to 40–50% of the stoichiometric amount when substantial quantities of non-acidulating electrolyte are present). Also depending on the conditions present, the extent of flocculation of the precipitate may vary.

After the precipitation has been completed, usually at least the balance of the stoichiometric quantity of carbon dioxide to covert the $Na_2O$ of the sodium silicate to $Na_2CO_3$, and generally an amount somewhat in excess thereof, is added.

It has heretofore been proposed in my aforesaid joint applications to use different rates of acidulation or different alkali metal ion concentrations in the several stages mentioned, i.e.

Stage 1: while $x$ is rising to a value between 4.2 and 5.3,
Stage 2: while $x$ is rising from said value of 4.2 to 5.3 to a value of 6.4,
Stage 3: while $x$ is rising from said value of 6.4 to a value of 10 or more, and it has been proposed in my copending sole application Ser. No. 458,480 filed May 24, 1965 (now Patent No. 3,307,906) to effect different dilutions of the aqueous alkali metal silicate during different stages of the acidulation, and it is to be understood that such proposals and proposals of other copending applications for patent on sole or joint inventions of the present applicant, may be employed with, and in certain instances form new combinations with, the new provisions of the present invention, wherein steps are taken to interrupt or suspend the acidulation during the precipitation of the predominant part of the silica pigment and to effect such precipitation while maintaining the aqueous alkali metal silicate at a predetermined constant $x$ value whereby to promote uniformity in the pigment precipitate produced and provide other advantages.

Thus a principal improvement of the present invention resides in combining with the other steps useful in preparing silica pigment a new manner of effecting the precipitation of the silica pigment after the first stage of acidulation has been performed.

Thus a first embodiment of the invention comprises the steps of (a) feeding the carbon dioxide into the aqueous alkali metal silicate at a first rate during the first stage of the acidulation wherein colloidal primary silica particles are being formed but wherein no appreciable number of colloidal silica particles have aggregated to form precipitating particles—which first stage may extend until the value of $x$ lies in the range of 4.2 to 5.3 or up to appearance of a Tyndall effect;

(b) then discontinuing the feeding of carbon dioxide and aging the aqueous alkali metal silicate for at least 20 minutes and preferably not more than 300 minutes to permit the formation of precipitating particles while maintaining a constant value of $x$; and (c) then feeding carbon dioxide into the aqueous alkali metal silicate at a second rate during a second stage of the acidulation until the value of $x$ exceeds 10;

said second rate being limited only by the rate at which the solution under the conditions of acidulation can absorb carbon dioxide, and said first rate being no more than ⅔ the rate at which the solution can absorb carbon dioxide as aforesaid.

In preferred species of this embodiment: the rate of feeding of the carbon dioxide during the first stage and/or the second stage may be regulated to require a time (depending on the conditions present) of at least 30 minutes and not over 300 minutes; the temperature may be maintained at or near room temperature but preferably is raised to the range of 50–99° C., most preferably about 80±10° C., during all or selected stages of the precipitation process—see copending application Ser. No. 480,143, filed Aug. 16, 1965, which application has been abandoned and re-filed as a streamlined continuation application Ser. No. 698,358, filed Jan. 16, 1968; the concentration of the aqueous alkali metal silicate is maintained in the range of 0.1 to 1.8, more preferably 0.5 to 1.3 moles of $SiO_2$ per liter during all or selected stages of the precipitation process; controlled agitation may be maintained during all or selected stages of the precipitation process; the aqueous alkali metal silicate may be maintained essentially free of quantities of metal salt other than that resulting from the acidulation of the alkali metal silicate; and the rates of acidulation during the first and second acidulation periods may be relatively adjusted to aid in controlling the relative sizes of the primary particles, the network particles, and the pigment flocs.

In these and broader aspects of the invention precipitation of silica pigment may be predominantly effected, preferably in the absence of soluble salt other than that produced by the acidulation, and predominantly at an $x$ value of not over 5.3, and predominantly by aging at no greater than said $x$ value.

After the flocs of precipitated silica pigment have been formed they may be recovered from the mother liquor in any suitable or preferred manner, e.g. by centrifuging, filtering, etc., and the silica pigment may be removed as wet cake or otherwise, and may be used per se, or be subjected to after treatments appropriate for their intended use.

The carbon dioxide gas employed in this invention may be full strength or may be diluted with air or other inert gases, e.g. such as the dilute carbon dioxide gas produced by the combustion of hydrocarbons such as propane or butane. See for example, copending applications Ser. No. 458,132, filed May 24, 1965 (now Patent No. 3,372,046). It may be fed at constant rate or at somewhat varied rates during the first and/or second acidulation periods, and while constant or substantially constant rates are preferred for uniformity of procedure and to facilitate process control, variations of course are permissible which essentially afford an average rate of the order of that referred to and which do not so far depart therefore is to materially effect the result obtained.

The process of the invention may be conducted in a batchwise or stepwise manner, or continuously, depending on available equipment. Suitable apparatus, for example, is set forth in copending joint application Ser. No. 142,668 (now Patent No, 3,256,068), in which, for example, the present invention can be practiced as a continuous process wherein the acidulation and aging steps are applied to moieties of the alkali-metal silicate solution in a series of zones, preferably coordinated with the periods of alteration of acidulation rates contemplated by the present invention.

In the examples herein, certain after-treatments are employed in each of the examples of the respective series set out to exemplify the invention and its advantages, but the particular after-treatments are not limiting of the invention claimed herein, and the novel ones thereof are claimed in other applications.

The silica product as wet filter or centrifuge cake may be master-batched with latices of natural or synthetic elastomers and/or plastomers.

The novel features and combinations of the invention are set forth in the claims appended hereto, but the practice of the invention itself will be more precisely understood by reference to the following specific examples embodying the same, which are to be considered as illustrative and not restrictive of the invention.

EXAMPLES 1–4

These examples were carried out in the following manner: to 10 liters of a 41° Bé. aqueous solution containing 20 moles sodium silicate of the composition represented by $Na_2O/(SiO_2)_{3.22}$ was added the quantity of water set forth in Table I, and placed in a precipitator vessel equipped with an agitator at a temperature of 30° C. This aqueous sodium silicate solution was acidified with carbon dioxide during the first stage over a period of 75 minutes, and the heat of acidulation raised the temperature a few degrees. This acidulation neutralized 38% of the alkali of the sodium silicate and raised the $x$ value to 5.2.

The feeding of carbon dioxide was then discontinued and the aqueous alkali metal silicate was aged for the period set forth in Table I, the temperature being raised during the first part of the aging period as set forth in Table I and maintained about constant for the latter part of the aging period as tabulated in Table I. Following the aging period the second stage acidulation with carbon dioxide was carried out as set forth in Table I, yielding silica precipitate slurries.

The silica precipitate was filtered and washed until soluble salts were less than 1%; acidified with sulfuric acid to a pH of 5.0 to 6.0; filtered; washed; dried overnight at 105° C.; and micropulverized, yielding silica pigments designated as Examples 1, 2, 3 and 4.

The silica pigment materials designated as Examples 1, 2, 3 and 4 were each compounded with a butadiene-styrene type elastomer (SBR–1502), according to the compounding recipe A set forth in Table II hereof for Examples 1 and 2, and recipe B for Examples 3 and 4.

TABLE I.—TYPICAL SILICAS PRODUCED WITH TWO STAGE ACIDULATION AND INTERVENING AGING STEP

| | Example No. | | | |
|---|---|---|---|---|
| | 1 | 2 | 3 | 4 |
| | Run No: VI– | | | |
| | 254 | 278 | 269 | 260 |
| Ingredients: | | | | |
| 41° Bé Sodium silicate, liters | 10 | 10 | 10 | 10 |
| 41°Bé Sodium silicate, moles | 20 | 20 | 20 | 20 |
| Water (liters) | 85 | 80 | 75 | 70 |
| $SiO_2$ concentration (moles/liters) | 0.68 | 0.71 | 0.76 | 0.80 |
| First stage acidulation with carbon dioxide: | | | | |
| Acidulation, initial percent | 0 | 0 | 0 | 0 |
| Acidulation, final percent | 38 | 38 | 38 | 38 |
| x-value, initial | 3.22 | 3.22 | 3.22 | 3.22 |
| x-value, final | 5.2 | 5.2 | 5.2 | 5.2 |
| Temperature, initial ° C | 30 | 30 | 30 | 30 |
| Temperature, final ° C | 36 | 35 | 35 | 34 |
| Time, minutes | 75 | 75 | 75 | 75 |
| Aging Period: | | | | |
| Elapsed time, total (minutes) | 140 | 90 | 90 | 105 |
| Elapsed time, at elevated temperature, min | 105 | 45 | 45 | 60 |
| Elevated temperature, ° C | 90 | 98 | 95 | 95 |
| Agitated by stirring, + | + | + | + | + |
| Second stage acidulation with carbon dioxide: | | | | |
| Acidulation, initial percent | 38 | 38 | 38 | 38 |
| Acidulation, final percent | 120 | 120 | 120 | 120 |
| Temperature, initial ° C | 90 | 98 | 95 | 95 |
| Temperature, final ° C | 80 | 87 | 85 | 85 |
| Time, minutes | 150 | 150 | 135 | 150 |

TABLE II

| Compound ingredients | Recipe A | Recipe B | Recipe D |
|---|---|---|---|
| | Quantities (Parts by weight) | | |
| Butadiene-styrene copolymer [1] | 100.0 | 100.0 | 100.0 |
| Silica filler material | 50.0 | 50.0 | 50.0 |
| Antioxidant 2246 2,2-methylene-bis (4-methyl-6-t.-butylphenol) | 2.0 | 2.0 | 2.0 |
| Paracoumarone-indene resin | ² 2.5 | ² 2.5 | ³ 2.5 |
| Reogen | 5.0 | 5.0 | 5.0 |
| Stearic acid | 1.5 | 1.5 | |
| Magnesia [4] | | | 4.0 |
| Zinc oxide | 5.0 | 5.0 | 5.0 |
| Di-2-benzothiazyl disulphide (Altax) | 0.75 | 0.75 | 0.75 |
| N,N'-Di-o-tolylguanidine (DOTG) | 1.5 | 1.5 | 1.5 |
| Sulfur | 2.0 | 2.0 | 2.0 |
| Triethanolamine | 1.0 | 1.0 | 1.0 |
| Monoethanolamine | 2.0 | 1.0 | 1.0 |

[1] SBR–1502.
[2] Cumar Resin RH, a trade marked product.
[3] Cumar Resin MH 2½, a trade marked product.
[4] Subject of copending application Serial Number 480,151, filed August 16, 1965, and now U.S. 3,399,116, issued August 27, 1968.

These compounds were aged over-night, remilled and cured for 120 minutes at 287° F.

The physical test data for the respective vulcanizates containing the foregoing silica pigment examples is set forth in Table III hereof.

TABLE III

| Silica tested (in vulcanizate) | Hardness, Shore A | 300% Modulus, p.s.i. | Ultimate tensile, p.s.i. | Elongation, percent |
|---|---|---|---|---|
| Example 1 | 79 | 900 | 3,710 | 680 |
| Example 2 | 80 | 740 | 3,930 | 760 |
| Example 3 | 82 | 770 | 4,030 | 760 |
| Example 4 | 80 | 800 | 4,100 | 730 |

Thus the silica pigments of Examples 1, 2, 3 and 4, were all shown to be very good elastomer reinforcing pigments, which term as used herein refers to pigments which when used at 50 parts per 100 parts SBR-1502 elastomer will yield a vulcanizate having an ultimate tensile strength of at least 3000 p.s.i.

EXAMPLES 5 THROUGH 8

All of these examples were prepared from 20 moles of 41° Bé. commercial sodium silicate diluted with 78 liters of water except that Examples 7 and 8 had in addition 10 and 20 moles of sodium chloride added initially, respectively. Also at completion of the first stage acidification and before aging 44 liters of diluting water were added in Example 7, Table IV. Further details are shown in Table IV.

TABLE IV.—FURTHER SILICAS PREPARED WITH TWO STAGE ACIDULATION AND INTERVENING AGING STEP

| | Example No. | | | |
|---|---|---|---|---|
| | 5 | 6 | 7 | 8 |
| | Run No. X— | | | |
| | 1 | 6 | 8 | 22 |
| Ingredients: | | | | |
| 41° Bé. sodium silicate, liters | 10 | 10 | 10 | 10 |
| 41° Bé. sodium silicate, moles | 20 | 20 | 20 | 20 |
| Sodium chloride, moles | 0 | 0 | 10 | 20 |
| Water, initial, liters | 78 | 78 | 78 | 78 |
| Water, added at end of first stage, liters | 0 | 0 | 0 | 44 |
| $SiO_2$ concentration, initial, moles per liter | 0.73 | 0.73 | 0.73 | 0.73 |
| $SiO_2$ after dilution, moles per liter | | | | 0.49 |
| First stage acidulation with carbon dioxide: | | | | |
| Acidulation, initial percent | 0 | 0 | 0 | 0 |
| Acidulation, final percent | 54 | 38.5 | 53.3 | 46.2 |
| x-Value, initial | 3.22 | 3.22 | 3.22 | 3.22 |
| x-Value, final [1] | 7.0 | 5.2 | 6.9 | 6.0 |
| Temperature, initial ° C | 80 | 80 | 80 | 30 |
| Temperature, final ° C | 80 | 80 | 80 | 30 |
| Time, minutes | 40 | 69 | 30 | 88 |
| Aging Period: | | | | |
| Elapsed time, total minutes | 75 | 135 | 22 | 85 |
| Elapsed time, at elevated temperature, min | 75 | 135 | 22 | 60 |
| Elevated temperature, ° C | 80 | 80 | 80 | 80 |
| Agitation by stirring throughout, + | + | + | + | + |
| Second stage acidulation with carbon dioxide: | | | | |
| Acidulation, initial percent | 54 | 38.5 | 53.3 | 46.2 |
| Acidulation, final percent | 140 | 119 | 124 | 117 |
| Temperature, initial ° C | 80 | 80 | 80 | 80 |
| Temperature, final ° C | 80 | 80 | 80 | 80 |
| Time, minutes | 100 | 135 | 90 | 122 |

[1] First stage in each of Examples 5-8 was terminated on appearance of Tyndall effect.

After completion of the second stage acidification, in each of Examples 5-8 the reactor was cooled and the silica slurry was pumped into a filter where it was filtered and washed until the soluble salt content thereof was below 1%. In each example a portion of the filter cake was slurried in water and the resulting slurries were treated as set forth in Table V, Examples 5-8.

TABLE V.—AFTER TREATMENTS OF EXAMPLES 5-8

| | Example No. | | | |
|---|---|---|---|---|
| | 5 | 6 | 7 | 8 |
| Silica slurry, grams | 3,860 | 600 | 4,000 | 5,250 |
| Dry basis, grams | 250 | 375 | 250 | |
| Basicity, pH | 8.2 | 8.2 | 8.0 | 8.6 |
| Water, liters | 1 | | | |
| Aluminum suflate, 10%, ml | 150 | 195 | | 150 |
| Sulfuric acid, 10%, ml | | | 44 | |
| Treated silica, pH | 4.5 | 4.3 | 3.5 | 4.5 |
| Filtered and washed, + | + | + | + | + |
| Dried at 105° C. and micropulverized, + | + | + | + | + |

The treated dry silica pigments so obtained were compounded according to recipe C, Table II, and were cured for 120 minutes at 287° F., and tested. The test data is set forth in Table VI.

TABLE VI

| Silica tested (in vulcanizate) | Hardness, Shore A | 300% Modulus, p.s.i. | Ultimate tensile, p.s.i. | Elongation, percent |
|---|---|---|---|---|
| 5 | 91 | 1,235 | 4,485 | 685 |
| 6 | 82 | 820 | 4,235 | 715 |
| 7 | 64 | 805 | 3,650 | 675 |
| 8 | 84 | 810 | 4,555 | 720 |

Again the test data demonstrated that silica pigments produced according to the present invention have excellent elastomer reinforcing properties.

While there have been described herein what are at present considered preferred embodiments of the invention, it will be obvious to those skilled in the art that minor modifications and changes may be made without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

What is claimed is:

1. In a process for the production of silica pigment by the acidulation with carbon dioxide of aqueous alkali metal silicate, said silicate being designated by the formula $M_2O/(SiO_2)_x$, wherein M is alkali metal, and said process being of the type which comprises (a) feeding the carbon dioxide into the aqueous alkali metal silicate at a first rate during the first stage of the acidulation wherein colloidal primary silica particles are being formed and during which $x$ attains a value between 4.2 and 7.0; and (b) then feeding carbon dioxide into the aqueous alkali metal silicate at a second rate during a second stage of the acidulation until the value of $x$ exceeds 10; said second rate being limited only by the rate at which the solution under the conditions of acidulation can absorb carbon dioxide, and said first rate being no more than ⅔ the rate at which the solution can absorb carbon dioxide as aforesaid, the improvement which comprises:
  (c) discontinuing the feeding of carbon dioxide and aging the aqueous alkali metal silicate for a period of least 20 minutes between steps (a) and (b) with $x$ remaining at the value attained in step (a).

2. The improvement defined in claim 1, wherein the aqueous alkali metal silicate is subjected to control agitation during said aging period.

3. The improvement defined in claim 1, wherein the aqueous alkali metal silicate is subjected to low shear agitation during said aging period.

4. The improvement defined in claim 1, wherein during said first stage and said aging period, the aqueous alkali metal silicate is maintained essentially free of metal salts other than those derived from the alkali metal silicate.

5. The improvement defined in claim 1, wherein said second rate is substantially equal to said first rate.

6. The improvement defined in claim 1, wherein the value of $x$ maintained during step (c) is the same as that at which the Tyndall effect appears.

References Cited

UNITED STATES PATENTS

| | | | |
|---|---|---|---|
| 3,250,594 | 5/1966 | Burke et al. | 23—182 |
| 2,731,326 | 1/1956 | Alexander et al. | 23—182 |

EDWARD STERN, Primary Examiner

U.S. Cl. X.R.

106—288; 260—41.5

UNITED STATES PATENT OFFICE
CERTIFICATE OF CORRECTION

Patent No. 3,503,707        Dated March 31, 1970

Inventor(s) Oliver W. Burke, Jr.

It is certified that error appears in the above-identified patent and that said Letters Patent are hereby corrected as shown below:

(1) Col. 1, line 67, for "alakil" read --alkali--

(2) Col. 4, line 53, for "therefore is" read --therefrom as--

(3) Col. 6, last line, for "U. S." read --U. S. Patent No.--

(4) Col. 7, line 73, for "sulflate" read --sulfate--

(5) Col. 9, line 4, for "least" read --at least--

(6) Col. 9, line 6, for "control" read --controlled--

Signed and sealed this 28th day of December 1971.

(SEAL)
Attest:

EDWARD M. FLETCHER, JR.
Attesting Officer

ROBERT GOTTSCHALK
Acting Commissioner of Patents